United States Patent
Keshavaraj

(10) Patent No.: US 6,598,902 B2
(45) Date of Patent: *Jul. 29, 2003

(54) WELDED AIRBAG CUSHION COMPRISING SEWN REINFORCEMENT SEAMS

(75) Inventor: Ramesh Keshavaraj, LaGrange, GA (US)

(73) Assignee: Milliken & Company, Spartanburg, SC (US)

( * ) Notice: Subject to any disclaimer, the term of this patent is extended or adjusted under 35 U.S.C. 154(b) by 8 days.

This patent is subject to a terminal disclaimer.

(21) Appl. No.: 10/013,221

(22) Filed: Dec. 10, 2001

(65) Prior Publication Data

US 2002/0067034 A1 Jun. 6, 2002

Related U.S. Application Data

(63) Continuation of application No. 09/406,000, filed on Sep. 24, 1999, now Pat. No. 6,364,356.

(51) Int. Cl.[7] ................................................ B60R 21/16
(52) U.S. Cl. .................................................. 280/743.1
(58) Field of Search .......................... 280/743.1, 728.1; 383/3, 107, 108; 156/73.1, 91, 92, 93

(56) References Cited

U.S. PATENT DOCUMENTS

| | | | | |
|---|---|---|---|---|
| 4,090,897 A | * | 5/1978 | Minick | 156/73.1 |
| 5,511,821 A | * | 4/1996 | Meyer et al. | 280/743.1 |
| 5,797,621 A | * | 8/1998 | Ono | 280/730.2 |
| 5,879,767 A | * | 3/1999 | Matsushima et al. | 428/35.2 |
| 6,019,390 A | * | 2/2000 | Keshavaraj | 280/743.1 |
| 6,083,584 A | * | 7/2000 | Smith et al. | 428/35.2 |
| 6,106,646 A | * | 8/2000 | Fairbanks | 156/73.3 |
| 6,199,898 B1 | * | 3/2001 | Masuda et al. | 280/730.2 |
| 6,209,912 B1 | * | 4/2001 | Staub et al. | 280/743.1 |
| 6,220,629 B1 | * | 4/2001 | Wipasuramonton et al. | 280/743.1 |
| 6,296,729 B1 | * | 10/2001 | Kamiyama et al. | 156/93 |
| 6,364,356 B1 | * | 4/2002 | Keshavaraj | 280/743.1 |

FOREIGN PATENT DOCUMENTS

| | | | | | |
|---|---|---|---|---|---|
| GB | 2251410 A | * | 7/1992 | | 280/743.1 |
| JP | 10102029 A | * | 4/1998 | | 280/743.1 |
| JP | 410086776 A | * | 4/1998 | | 280/743.1 |
| WO | 90/15713 | | * | 12/1990 | 280/743.1 |

* cited by examiner

*Primary Examiner*—Brian L. Johnson
*Assistant Examiner*—G B Klebe
(74) *Attorney, Agent, or Firm*—Terry T. Moyer; William S. Parks

(57) ABSTRACT

An airbag construction utilizing welds, reinforced with sewn seams, to adhere two fabrics together to form an inflatable airbag cushion. Although welded seams provide better and more easily produced attachment points between multiple layers of fabrics, not to mention improved manners of reducing air or gas permeability at such attachment points, the utilization of sewn seams adjacent to such welded areas provides stronger reinforcement, and thus more reliable nonpermeable fabrics. Seam welding generally concerns the utilization of a film on the underside of a fabric which, upon contact with a second, film-treated fabric and upon exposure to high frequency energy, forms a bead of polymeric material at the attachment point between the two fabric layers. Lower numbers of sewn seams may be utilized to permit sufficient reinforcement if the size of the formed polymeric bead is of sufficient size to permit thorough sealing and adhesion between the fabric layers. Such a specific reinforced fabric, as well as high bead-size welded airbag fabrics are encompassed within this invention.

4 Claims, 1 Drawing Sheet

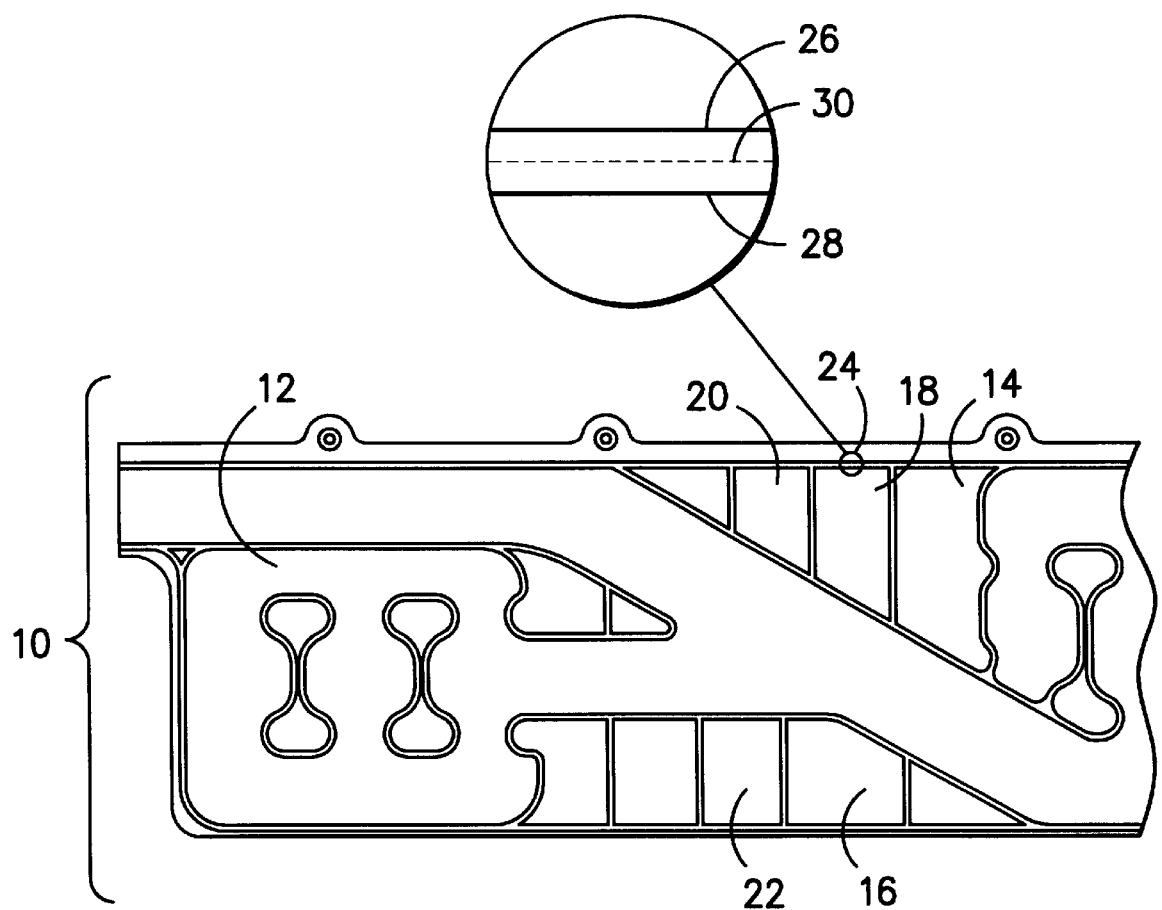
FIG. -1-
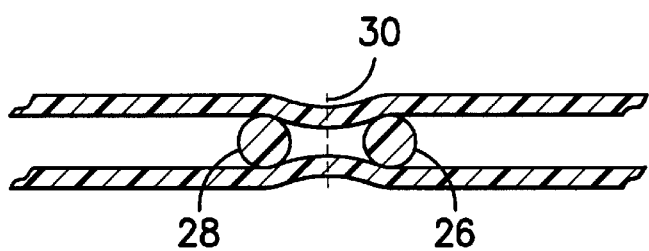
FIG. -2-

WELDED AIRBAG CUSHION COMPRISING SEWN REINFORCEMENT SEAMS

CROSS REFERENCE TO RELATED APPLICATIONS

This application is a continuation of application Ser. No. 09/406,000, filed on Sep. 24, 1999 now U.S. Pat. No. 6,364,356 B1. This parent application is herein entirely incorporated by reference.

FIELD OF THE INVENTION

The present invention relates to a method utilizing welds, reinforced with sewn seams, to adhere two fabrics together to form an inflatable airbag cushion. Although welded seams provide better and more easily produced attachment points between multiple layers of fabrics, not to mention improved manners of reducing air or gas permeability at such attachment points, the utilization of sewn seams adjacent to such welded areas provides stronger reinforcement, and thus more reliable nonpermeable fabrics. Seam welding generally concerns the utilization of a film on the underside of a fabric which, upon contact with a second, film-treated fabric and upon exposure to high frequency energy, forms a bead of polymeric material at the attachment point between the two fabric layers. Lower numbers of sewn seams may be utilized to permit sufficient reinforcement if the size of the formed polymeric bead is of sufficient size to permit thorough sealing and adhesion between the fabric layers. Such a specific reinforced fabric, as well as high bead-size welded airbag fabrics are encompassed within this invention.

BACKGROUND OF THE PRIOR ART

All U.S. patents cited herein are hereby fully incorporated by reference.

Inflatable protective cushions used in passenger vehicles are a component of relatively complex passive restraint systems. The main elements of these systems are: an impact sensing system, an ignition system, a propellant material, an attachment device, a system enclosure, and an inflatable protective cushion. Upon sensing an impact, the propellant is ignited causing an explosive release of gases filling the cushion to a deployed state which can absorb the impact of the forward movement of a body and dissipate its energy by means of rapid venting of the gas. The entire sequence of events occurs within about 30 milliseconds. In the undeployed state, the cushion is stored in or near the steering column, the dashboard, in a door, or in the back of a front seat placing the cushion in close proximity to the person or object it is to protect.

Inflatable cushion systems commonly referred to as air bag systems have been used in the past to protect both the operator of the vehicle and passengers. Systems for the protection of the vehicle operator have typically been mounted in the steering column of the vehicle and have utilized cushion constructions directly deployable towards the driver. These driver-side cushions are typically of a relatively simple configuration in that they function over a fairly small well-defined area between the driver and the steering column. One such configuration is disclosed in U.S. Pat. No. 5,533,755 to Nelsen et al., the teachings of which are incorporated herein by reference.

Inflatable cushions for use in the protection of passengers against frontal or side impacts must generally have a more complex configuration since the position of a vehicle passenger may not be well defined and greater distance may exist between the passenger and the surface of the vehicle against which that passenger might be thrown in the event of a collision. Prior cushions for use in such environments are disclosed in U.S. Pat. No. 5,520,416 to Bishop; U.S. Pat. No. 5,454,594 to Krickl; U.S. Pat. No. 5,423,273 to Hawthorn et al.; U.S. Pat. No. 5,316,337 to Yamaji et al.; U.S. Pat. No. 5,310,216 to Wehner et al.; U.S. Pat. No. 5,090,729 to Watanabe; U.S. Pat. No. 5,087,071 to Wallner et al.; U.S. Pat. No. 4,944,529 to Backhaus; and U.S. Pat. No. 3,792,873 to Buchner et al.

The majority of commercially used restraint cushions are formed of woven fabric materials utilizing multifilament synthetic yarns of materials such as polyester, nylon 6 or nylon 6,6 polymers. Representative fabrics for such use are disclosed in U.S. Pat. No. 4,921,735 to Bloch; U.S. Pat. No. 5,093,163 to Krummheuer et al.; U.S. Pat. No. 5,110,666 to Menzel et al.; U.S. Pat. No. 5,236,775 to Swoboda et al.; U.S. Pat. No. 5,277,230 to Sollars, Jr.; U.S. Pat. No. 5,356,680 to Krummheuer et al.; U.S. Pat. No. 5,477,890 to Krummheuer et al.; U.S. Pat. No. 5,508,073 to Krummheuer et al.; U.S. Pat. No. 5,503,197 to Bower; and U.S. Pat. No. 5,704,402 to Bowen et al.

As will be appreciated, the permeability of an airbag cushion structure is an important factor in determining the rate of inflation and subsequent rapid deflation following the impact event. Different airbag cushions are utilized for different purposes. For instance, some airbag cushions are installed within inflation modules for driver protection within the steering column of an automobile. Others are utilized as protection for front seat passengers and are installed in and around the glove compartment and/or on the dashboard in front of such a passenger seat. Still others have been developed in an effort to protect all passengers during a long-duration impact event, such as, for example, a rollover collision. In those types of crashes, the target airbag cushion must inflate quickly under high pressure (such as between about 40 and 50 psi) and remain inflated at relatively high pressures in order to provide the greatest degree of protection to such passengers. Furthermore, such long-duration airbag cushions preferably comprise "pillow" formations created through the attachment of at least two different fabrics or fabric ends together and sealed, sewn, or the like, together. Upon inflation the free space between the attachment points inflate as well, thereby producing the desired cushioned "pillow" structures. Such long-duration, "pillowed" structures have been disclosed in the prior art as airbag cushions within U.S. Pat. No. 5,788,270 to Haland. However, in order to provide a suitable, effective airbag fabric and cushion comprising two or more points of attachment between fabrics or fabric ends, there has been a need to improve upon the structural integrity of the seams at such attachment points to prevent unwanted and potentially harmful leakage of gas or air from within the target airbag cushion. The prior art has discussed the development of coatings to place over the sewn seams at such attachment points in order to seal the potentially loose portions of such seams and/or to keep the individual yarns of the airbag fabrics at the attachment points stationary in order to prevent yarn shifting and thus possible openings for air or gas leakage. However, such coatings have not proven fully capable of providing such needed benefits. Most coatings comprise silicones which actually tend to act as yarn lubricants and thus not only do not prevent, but permit deleterious yarn shifting. Also, the amount and/or thickness required of such coatings is relatively high which creates a tackiness problem between fabrics portions during storage in an inflation module. When the airbag cushion is packed tightly in such closed quarters, the coatings may tend to increase the adhesiveness between the contacting fabric portions which may consequently create difficulties in unfolding of the cushion upon inflation. Furthermore, such thick coatings are rather costly and thus increase the overall price passed on to the consumer. In recent years, there has been a tremendous push to producing highly effective airbag cushions while simultaneously lowering the costs associated with such production. Thus, some manner of providing proper, well-performing, cost-effective attachment points between airbag fabrics or airbag fabric ends is necessary to meet these industry requirements. To date, the prior art has not accorded such an improvement in performance and cost to the airbag cushion market.

SUMMARY OF THE INVENTION

In view of the foregoing, it is a general object of the present invention to provide an effective, reinforced, welded airbag fabric for incorporation within an airbag cushion for utilization within a vehicle restraint system. The term "vehicle restraint system" is intended to mean both inflatable occupant restraining cushion and the mechanical and chemical components (such as the inflation means, ignition means, propellant, and the like). It is a more particular object of the present invention to provide an airbag fabric wherein the reinforcement seam is sewn in an area adjacent to the welded seam. A further object of this invention is to provide an airbag fabric which comprises attachment points connected and held in place through the utilization of relatively large polymeric beads.

To achieve these and other objects and in accordance with the purpose of the invention, as embodied and broadly described herein, the present invention provides an airbag fabric for incorporation within an airbag cushion comprising at least one welded seam as a point of attachment between two fabric panels, wherein said airbag fabric also comprises at least one sewn seam located adjacent to said welded seam. This invention also encompasses an airbag fabric for incorporation within an airbag cushion comprising at least one welded seam as a point of attachment between two fabric ends, wherein said welded seam comprises a polymeric bead having an average thickness of from about 2 to about 40 mils.

The term "welded seam" encompasses any attachment point between two panels of fabric through the utilization of a welding process. In general, such a process entails the film-coating of the fabric panels with a polymeric dipolar thermoplastic material; contacting the film-coated panels; placing a high intensity electron discharging mold over the designated area of the fabric in which a seam is to be produced; applying such a high intensity electron field to the film-coated fabric panels which consequently makes the electrons within the dipolar thermoplastic material to move from one pole to the other thereby creating friction which ultimately produces heat; and through the exposure to such heat, forming elongated polymeric beads which adhere to both fabric panels and fill the interstitial space between the fabric panels (the term "fabric panels" connotes either the utilization of two different, separate pieces of fabric or two different ends of one fabric which are joined together through such a welding process). Such polymeric beads bear the load upon the attachment points created by the high pressure of inflation. However, the contact zone between the beads and the fabric panels will substantially encompass merely the top portion of such beads. Consequently, there still exists a possibility that the polymeric beads will not be able to prevent tearing of the panels from the beads due to such a low contact surface area.

Thus, although seam welding, which is more fully discussed in U.S. patent application Ser. No. 09/326,368 now U.S. Pat. No. 6,344,251 B1 to Keshavaraj et al., produces excellent and strong seam attachments in order to substantially prevent tearing of the airbag fabric panels during inflation, the airtight structure produced by such polymeric beads may be compromised through the incomplete securing of the bead to the fabric. The inventive fabric thus improves upon this potentially problematic effect by securing more of the fabric around the beads after they have been elongated and cooled (welded) into the fabric structure. The sewn seam must be present in an area adjacent to the welded seam. By adjacent, it is meant that the sewn seam is produced either between two different attachment points (thus producing a seam between the welded seams) or, if only one welded seam is present, at a distance closer to the edges of the fabric panels than the welded seam but close enough to increase the amount of fabric in contact with the polymeric bead of the welded seam. Generally, such a distance is from about 0.1 cm to about 5 cm; preferably from about 0.1 cm to about 3 cm; more preferably from about 0.5 cm to about 2 cm; and most preferably from about 0.5 to about 1 cm. The length of the sewn seams is not important, although a sufficient length is necessary to ensure sufficient contact between the polymeric beads and the fabric. Too short a length will not create a sufficient contact surface area; too long may interfere with the performance of the remaining portions of the airbag fabric. The term "sewn seam" is intended to encompass any type of seam produced by repeated stitching such as through the use of needle stitches, ultrasonic stitches, and the like. Any type of strong, industrial thread may be utilized which provides the necessary reinforcement strength to the welded seam. Thus, any size thread from about #40 to about #200 may be utilized. The seam may be single-needle, preferably; however, multiple needle stitching may also be performed.

Another method of increasing the strength of the welded seam is to increase the overall thickness of the polymeric bead produced by such a process. This thickness increase will increase the contact surface area between the bead and the fabric thereby filling more interstitial space as well and ultimately reducing the potential for air or gas leaks through the airbag fabric. It has been found that this alteration of standard RF-welding techniques is the only manner to facilitate production of more leak-resistant fabrics. Theoretically, a modification of the geometry of such polymeric beads would also result in better contact between with the target fabric; however, such geometrical alterations is very difficult to accomplish since the polymeric film, during the welding process, orients itself to a spherical shape more easily and readily than other configurations. Thus, a bead thickness of at least four times the thickness of the polymeric film coating on the target fabric is necessary to effectuate the desired elongation and resultant adhesion of the bead to the fabric. Since such polymeric film coatings exhibit average thicknesses of from about 0.5 to about 10 mils, the preferred bead average thickness should be from about 2 to about 40 mils; preferably from about 5 to about 40 mils; more preferably from about 10 to about 30 mils; and most preferably from about 20 to about 30 mils. To produce such a thick bead, a weld head must be utilized which requires a thickness itself of greater than 2,000 times the thickness of the film on the fabric surface. Thinner bead structures produce inconsistent weld strengths within the target fabrics since the direction of molten polymer flow over the fabric surface is very difficult to control, particularly if the curved area or straight-line area at the point of attachment of the fabric panels is not uniform. The thicker bead production substantially reduces these problems of non-uniformity in the fabric structure by providing more polymer surface area for a greater amount of fabric-bead contact. The bead will deform during welding to fill the open spaces between the fabric panels and cover a wider area of the fabric panels, particularly around the attachment points. Such an increase in surface coverage and space filling thus permits the production of a more robust seam than under previously known seam-welding techniques.

Even with the utilization of such an improved seam production method, there still remains a possibility for unraveling, tearing, or seam failure within the fabric due to insufficient bead-fabric contact. As noted above, this potential problem may be corrected through the utilization of a sewn seam adjacent to the welded seam.

PREFERRED EMBODIMENT OF THE INVENTION

The Examples below are indicative of the particularly preferred embodiment within the scope of the present invention:

EXAMPLE 1

Two woven fabrics, each comprising 420 denier nylon-6,6 yarns and exhibiting a 39×39 picks/ends per inch construction, were coated with 2.4 ounces of a standard polyurethane airbag coating plus an adhesion promoter applied to one side of each target fabric. The coated surfaces were then contacted together and a weld head was placed over the two-fabric composite. The two-fabric composite was then exposed to a high frequency electromagnetic field reversing itself in excess of 27 million times per second (27 MHz) which eventually heated up the film at the proposed weld location between the two fabrics. The resultant beads produced through such a procedure created a welded seam of approximately 3 mm over the entire length of the two fabrics, thereby connecting the fabrics at one location. After cooling, the fabrics were then transported to a sewing machine. A seam was then sewn with a #138 thread through a single #140 needle, exhibiting about 20 stitches per 100 mm of seam length parallel to the welded seam and about 5 mm from the welded seam. The tear strength of the two seams was beyond that required for standard airbag products (i.e., greater than about 275 pounds per foot).

EXAMPLE 2

Two woven fabrics, each comprising 210 denier nylon-6,6 yarns and exhibiting a 55×55 picks/ends per inch construction, were coated with 2.7 ounces of a standard polyurethane airbag coating plus an adhesion promoter applied to one side of each target fabric. The coated surfaces were then contacted together and a weld head was placed over the two-fabric composite. The two-fabric composite was then exposed to a high frequency electromagnetic field reversing itself in excess of 27 million times per second (27 MHz) which eventually heated up the film at two adjacent proposed weld locations between the two fabrics. Electrodes each having widths of approximately 6 mm, aproximately 3 mm apart, over the entire length of the two fabrics were utilized, thereby connecting the fabrics at one location. After cooling, the fabrics were then transported to a sewing mahcine. A seam was then sewn with a #92 thread through a single #140 needle, exhibiting about 40 stitches per 100 mm of seam length parallel to the welded seam and about 5 mm from the welded seam. The tear strength of the two seams was beyond that required for standard airbag products (i.e., greater than about 275 pounds per foot).

BRIEF DESCRIPTION OF THE DRAWINGS

FIG. 1 provides an aerial view of a portion of an inventive airbag with a magnified view of the inventive sewn (stitched) seam located between two welded seams.

FIG. 2 depicts a cross-sectional view of the magnified portion of FIG. 1.

DETAILED DESCRIPTION OF THE DRAWINGS

As depicted in FIG. 1, a side curtain airbag 10 with individual pillowed compartments 12, 14, 16, 18, 20, 22, as examples (uninflated as depicted), formed through the utilization of welded seams 24 (as an example). As shown in the magnified view of the welded seams 24, there are two welded seams 26, 28, with a single stitched (sewn) seam 30 located adjacent to both to provide increased tear strength as noted above in the EXAMPLEs.

In FIG. 2, the welded seams 24 are more easily seen in cross-section as the two welded polymeric beads 26, 28 having average thicknesses of between 20 and 30 mils are separated by an adjacently located stitched seam 30. Again, such a configuration provides increased tear strength as noted above.

While specific embodiments of the invention have been illustrated and described, it is to be understood that the invention is not limited thereto, since modifications may certainly be made and other embodiments of the principals of this invention will no doubt occur to those skilled in the art. Therefore, it is contemplated by the appended claims to cover any such modifications and other embodiments as incorporate the features of this invention which in the true spirit and scope of the claims hereto.

What I claim is:

1. An airbag fabric cushion comprising at least two fabric layers, wherein at least one welded seam is present as a point of attachment between said at least two fabric layers, wherein said at least two fabric layers each exhibit an internal portion in relation to said airbag cushion and an external portion in relation to said airbag cushion, wherein said airbag cushion also comprises at least one stitched reinforcement seam located either between two different attachment points or, if only one welded seam is present, at a distance closer to the edges of said at least two fabric layers than said welded seam, wherein the stitches within said at least one stitched reinforcement seam pass through both the internal and external portions of said at least two fabric layers; wherein said at least one stitched reinforcement seam exhibits a tear strength in excess of that associated with standard airbag inflation pressures.

2. The airbag cushion of claim 1 wherein said stitched reinforcement seam is formed by thread-stitching or ultrasonic-stitching.

3. An airbag fabric cushion comprising at least two fabric layers, wherein at least one adhesive seam is present as a point of attachment between said at least two fabric layers, wherein said at least two fabric layers each exhibit an internal portion in relation to said airbag cushion and an external portion in relation to said airbag cushion, wherein said airbag cushion also comprises at least one stitched reinforcement seam located either between two different adhesive seams or, if only one adhesive seam is present, at a distance closer to the edges of said at least two fabric layers than said welded seam, wherein the stitches within said at least one stitched reinforcement seam pass through both the internal and external portions of said at least two fabric layers; wherein said at least one stitched reinforcement seam exhibits a tear strength in excess of that associated with standard airbag inflation pressures.

4. The airbag cushion of claim 3 wherein said stitched reinforcement seam is formed by thread-stitching or ultrasonic-stitching.

* * * * *

UNITED STATES PATENT AND TRADEMARK OFFICE
CERTIFICATE OF CORRECTION

PATENT NO. : 6,598,902 B2  Page 1 of 1
DATED : July 29, 2003
INVENTOR(S) : Ramesh Keshavaraj It is certified that error appears in the above-identified patent and that said Letters Patent is hereby corrected as shown below:

Column 6,
Line 56, after the word "send" delete "welded" and insert -- adhesive --.

Signed and Sealed this

Eighth Day of June, 2004

JON W. DUDAS
*Acting Director of the United States Patent and Trademark Office*